United States Patent [19]

Chen et al.

[11] Patent Number: 5,434,213

[45] Date of Patent: Jul. 18, 1995

[54] PRESSURE SENSITIVE ADHESIVE WITH ENHANCED ADHESION TO LOW SURFACE ENERGY SUBSTRATES

[75] Inventors: Gang-Fung Chen, Worthington; Laurence G. Dammann, Westerville, both of Ohio

[73] Assignee: Ashland Oil, Inc., Ashland, Ky.

[21] Appl. No.: 86,101

[22] Filed: Jun. 30, 1993

Related U.S. Application Data

[63] Continuation-in-part of Ser. No. 768,362, Sep. 17, 1991, abandoned.

[51] Int. Cl.$^6$ .................... C09J 123/08; C09J 131/02; C09J 131/04; C09J 133/02
[52] U.S. Cl. .................... 524/533; 524/529; 524/535; 524/536
[58] Field of Search ................ 524/533, 529, 535, 536

[56] References Cited

U.S. PATENT DOCUMENTS

| | | | |
|---|---|---|---|
| 4,957,974 | 9/1990 | Ilenda et al. | 525/301 |
| 5,079,047 | 1/1992 | Bogaert et al. | 428/41 |

*Primary Examiner*—Joseph L. Schofer
*Assistant Examiner*—Wu C. Cheng
*Attorney, Agent, or Firm*—Mueller and Smith

[57] ABSTRACT

Broadly, the present invention is directed to a pressure sensitive adhesive that possesses enhanced adhesion to low surface energy substrates. The inventive PSA comprises the free-radical polymerization reaction product prepared in the presence of a free-radical initiator and dispersed in organic solvent of between about 0.5% and 10%, by weight of the non-volatile solids of the reaction product, of an organic solvent soluble, high ethylene-containing polymer; and a mixture of ethylenically-unsaturated monomers. Such mixture of monomers comprises between 0% and not substantially above about 10%, by weight of the non-volatile solids of the reaction product, of an ethylenically-unsaturated carboxylic acid or anhydride; and the balance being a non-carboxyl/non-anhydride-functional vinyl monomer or mixture of monomers. The $T_g$ of the polymerized mixture of monomers is not substantially above about $-20°$ C. The polymerization reaction product has a molecular weight which ranges from between about 100,000 and 600,000 and a $T_g$ not substantially above about $-20°$ C. Optionally, the reaction product can be cross-linked with an aluminum, titanium, or zirconium salt or chelate. Also, the reaction product can be cross-linked with a melamine resin. A preferred reaction product comprises ethylene vinyl acetate copolymer grafted with a mixture of monomers comprising acrylic acid, methyl methacrylate, isobornyl methacrylate, and 2-ethylhexyl acrylate. The reaction product additionally may contain unreacted components including the high ethylene-containing polymer, and one or more of the mixture of ethylenically-unsaturated monomers.

10 Claims, 3 Drawing Sheets

PRESSURE SENSITIVE ADHESIVE WITH ENHANCED ADHESION TO LOW SURFACE ENERGY SUBSTRATES

CROSS-REFERENCE TO RELATED APPLICATION

This application is a continuation-in-part of application U.S. Ser. No. 07/768,362, filed Sep. 17, 1991, now abandoned the disclosure of which is expressly incorporated herein by reference.

BACKGROUND OF THE INVENTION

The present invention relates to pressure sensitive adhesives and more particularly to acrylic pressure sensitive adhesives that possess enhanced adhesion to low energy substrates.

Acrylic pressure sensitive adhesives have been gaining commercial importance over the last 30 years. Due primarily to their polar nature, it is known that acrylic pressure-sensitive adhesives (PSA's) do not have good adhesion to low surface energy substrates, such as typified by polyolefins. Typically, a 180° peel on untreated polyethylene, for example, of less than 0.5 lb/in has been observed using commercial acrylic PSA's.

A variety of modifications of acrylic PSA's have been found in the literature with such modifications providing varying degrees of improvement in adhesion to polyolefin and other low surface energy substrates. For example, U.S. Pat. No. 4,243,789 proposes a liquid hydroxyl-containing alkyl acrylate copolymer which includes a major proportion of alkyl acrylates of acrylic acid with smaller amounts of N-vinyl-2-pyrrolidone and a hydroxyl-containing monomer. U.S. Pat. No. 4,728,684 proposes an adhesive which includes a thermoplastic polyester urethane rubber which has been grafted with an acrylic monomer, a chlorinated rubber, and an isocyanate cross-linking agent. U.S. Pat. No. 4,726,982 proposes PSA's which include an acrylic copolymer which is made from monomers which include N-vinyl-lactam, and a tackifier resin. Japanese 63 57 684 proposes adhesives prepared from tertiary amine group-containing copolymers such as, for example, dimethyl aminoethyl methacrylate/2-ethylhexyl acrylate copolymer and bisphenol-A/epichlorohydrin copolymer dispersed in organic solvent. Such adhesive is stated to have good adhesion to polyolefin substrates.

U.S. Pat. No. 5,079,047 proposes a solventless, photo-initiated adhesive comprising, by weight, 60-95% of an alkyl acrylate, 5-40% of a copolymerizable monomer such as acrylic acid, and 10-30% ethylene vinylacetate. U.S. Pat. No. 3,737,483 proposes a carboxylated polymer product comprising maleic anhydride polymerized with an α-olefin in contact with an ethylene vinyl acetate (EVA) copolymer in the presence of an organic peroxide and organic diluent. U.S. Pat. No. 3,749,756 proposes the same carboxylated polymer 5product sans peroxide and organic diluent. U.S. Pat. No. 4,347,341 proposes ethylene graft copolymers containing anhydride or carboxyl groups which are made from vinyl esters of monocarboxylic acid, maleic anhydride and esters thereof which are radically polymerized in the presence of 30-95% by weight of ethylene homopolymers or ethylene vinyl ester copolymers. U.S. Pat. No. 4,762,882 proposes modified polyolefin resins which consist essentially of a copolymer of ethylene and α-olefin and an unsaturated carboxylic acid grafted on the ethylene copolymer. U.S. Pat. No. 4,810,755 proposes an adhesive composition comprising a metal-containing composition consisting of an ethylene-(meth)acrylate copolymer grafted with an ethylenic unsaturated carboxylic acid or its acid anhydride and an ethylenic unsaturated carboxylic or its acid anhydride of a metal hydroxide. U.S. Pat. No. 4,908,411 proposes modified ethylenic random copolymers derived from ethylene-α-olefin copolymers grafted with unsaturated carboxylic acids, styrene-type hydrocarbons, or unsaturated silanes. U.S. Pat. No. 4,917,734 proposes ethylene copolymers which have been grafted with styrene-based, vinyl, acrylic, and/or methacrylic grafting monomers. U.S. Pat. No. 4,977,212 proposes resin compositions comprising a metal-containing composition consisting of an ethylene ester copolymer and an unsaturated carboxylic acid or its acid anhydride, a saponified EVA copolymer, and a hydrophobic thermoplastic resin.

Despite such proposals, there yet is a need in the art for acrylic-based PSA's that possess enhanced adhesion to low surface energy substrates.

BROAD STATEMENT OF THE INVENTION

Broadly, the present invention is directed to a pressure sensitive adhesive that possesses enhanced adhesion to low surface energy substrates. The inventive PSA comprises the free-radical polymerization reaction product prepared in the presence of a free-radical initiator and dispersed in organic solvent of between about 0.5% and 10%, by weight of the non-volatile solids of the reaction product, of an organic solvent soluble, high ethylene-containing polymer; and a mixture of ethylenically-unsaturated monomers. Such mixture of monomers comprises between 0% and not substantially above about 10%, by weight of the non-volatile solids of the reaction product, of an ethylenically-unsaturated carboxylic acid or anhydride; and the balance being a non-carboxyl/non-anhydride-functional vinyl monomer or monomer mixture. The Tg of the polymerized mixture of monomers is not substantially above about −20° C. The polymerization reaction product has a molecular weight which ranges from between about 100,000 and 600,000 and a Tg not substantially above about −20° C. Optionally, the reaction product can be cross-linked with an aluminum, titanium, or zirconium salt or chelate. Also, the reaction product can be cross-linked with a melamine resin. A preferred reaction product comprises an ethylene vinyl acetate copolymer grafted with a mixture of monomers comprising acrylic acid, isobornyl methacrylate, methyl methacrylate, and 2-ethylhexyl acrylate. The reaction product additionally may contain unreacted components including the high ethylene-containing polymer, and one or more of the mixture of ethylenically-unsaturated monomers.

Figure 1:
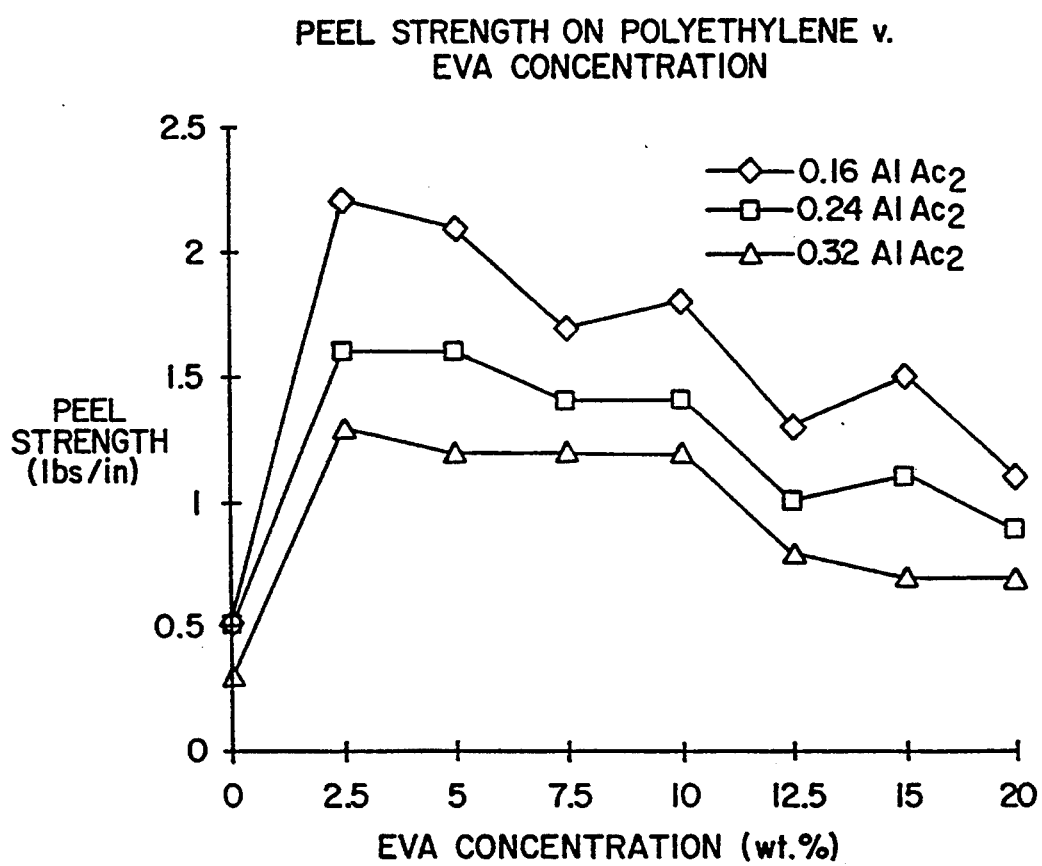
FIG. 1 graphically depicts the peel strength on polyethylene of the inventive pressure sensitive adhesive as a function of EVA concentration and for differing amounts of Al(Ac)$_2$.

The figures will be described further in connection with the following detailed Description of the Invention.

DETAILED DESCRIPTION OF THE INVENTION

Referring initially to the high ethylene-containing polymer, a wide variety of ethylene/vinyl ester and ethylene/acrylate copolymers are known and used in the adhesive art. These copolymers include, for example, ethylene/methyl acrylate/methacrylic acid, ethylene/vinyl acetate (EVA), ethylene/butyl acrylate (EBA), ethylene/methyl acrylate (EMA), ethylene/ethyl acrylate, ethylene/n-hexyl acrylate, ethylene/2-ethylhexyl acrylate, and the like and mixtures thereof. However, for the purposes of the present invention, EVA is preferred.

Terpolymers of ethylene additionally can be used, for example, ethylene/propylene/(meth)acrylate, provided that such terpolymers are soluble in organic solvents. In this regard, it will be understood that the ethylene copolymer or terpolymer is soluble in one or more organic solvents in order for inclusion in the reaction mixture subjected to free-radical polymerization in accordance with the precepts of the present invention. By "high ethylene-containing" is meant that the copolymer (or terpolymer) contains at least about 40 wt-% ethylene content. Advantageously, the high ethylene-containing copolymer will have a molecular weight of between about 10,000 and 500,000 and a Tg of not above about $-10°$ C. By convention, the parentheticals used herein designate optional content, i.e. (meth)acrylate means "acrylate" or "methacrylate", and the same is true for any parenthetical plurals used herein.

Referring now to the mixture of ethylenically-unsaturated monomers, from between about 0% to not substantially above about 10%, by weight of the non-volatile solids of the reaction product, comprises an ethylenically-unsaturated carboxylic acid or anhydride. While the preferred acid simply is acrylic acid, a variety of additional ethylenically-unsaturated carboxylic acids may be useful in the present invention. Additional acids (and their corresponding anhydrides, where appropriate, including partial esters thereof) include, for example, butenic acids, e.g., crotonic acid, and vinylacetic acid; an acid from the fumaric acid series, e.g., fumaric acid and maleic acid; allyl malonic acid, and allyl succinic acid; and other dicarboxylic acids, e.g., itaconic acid and citraconic acid. Lower alkyl-substituted (e.g., $C_1-C_4$ alkyl group) acrylic acid, e.g. methacrylic acid, additionally can find use in formulating the reaction product of the present invention.

The balance of the mixture of monomers comprises a non-carboxyl/non-anhydride-functional vinyl monomer or mixture of monomers. Such monomers are typified by (meth)acrylic esters of $C_1-C_{18}$ alkyl groups optionally substituted with amine groups, ether groups, aromatic groups, and the like. Optionally, the mixture of monomers can contain styrene or other aromatic polymerizable monomer, vinyl chloride, vinylidene chloride, or other hydrophobic monomer.

Of importance in forming the mixture of ethylenically-unsaturated monomers for grafting onto the ethylene copolymer is that such mixture of monomers when polymerized will have a Tg not substantially above about $-20°$ C. Thus, the choice of monomers forming the mixture of monomers must be selected judiciously. A preferred mixture comprises acrylic acid, methyl methacrylate, isobornyl methacrylate, and 2-ethylhexyl acrylate.

A variety of free-radical initiators can be used in conventional fashion. Such initiators include, for example, benzoyl peroxide, azobisisobutyronitrile, cumene hydroperoxide, t-butyl hydroperoxide, potassium persulfate, ammonium persulfate, and the like, and even mixtures thereof. An effective amount of initiator is present in the reaction mixture which generally translates from between about 0.05 and 2.0% by weight of the reaction solids.

The organic solvent, or more aptly mixture of solvents, must be effective in solubilizing the high ethylene-containing polymer. Such solvents broadly include alcohols, esters, ethers, or aromatic solvents, and mixtures thereof. Representatives of such solvents include, for example, ethyl acetate, butyl acetate, methyl ethyl ketone, cyclohexanone, acetone, toluene, xylene, benzene, cyclohexane, and the like, and mixtures thereof. The proportion of solvent is adjusted to provide a non-volatile solids content of the reaction product of between about 25% and 75%.

The reaction can be carried out at temperatures ranging from about 25° to 150° C. with metered addition of monomers and initiator carried out in conventional fashion. The reaction is conducted to produce a reaction product which has a molecular weight ranging from between about 100,000 and 600,000, and a Tg not substantially above about $-20°$ C. The PSA optionally then can be cross-linked with an aluminum, titanium, or zirconium salt or chelate, or a melamine resin.

With respect to substrates, the inventive PSA provides enhanced adhesion to low surface energy substrates. The surface energy of a 7polymer is a direct manifestation of intermolecular forces. The surface energy is directly related to the surface tension by a temperature factor. Surface energy, T, is reported in units of dyne/cm. Low surface energy substrates are typified by polyolefins (polyethylene and polypropylene), and cured synthetic polymers such as butyl, EPDM (ethylene-propylene-diene monomer), EP (ethylene-propylene), and isoprene.

Tackifiers are a class of additives that often are included in PSA formulations. Rosin and rosin derivatives are a class of well-known tackifiers which can be incorporated into the PSA of the present invention. Additional tackifiers can be found in U.S. Pat. Nos. 4,726,982 and 4,728,684, cited above.

Additional conventional additives may be incorporated into the adhesive composition, including, for example, wetting agents, pigments, antioxidants, ultraviolet absorbers, antistatic agents, lubricants, fillers, opacifying agents, anti-foam agents, and the like and mixtures thereof. The adhesives may be applied to one or both sides of the film face stock in a conventional manner, for example, by spraying, knife coating, roller coating, casting, drum coating, dipping, and the like. Indirect application using a transfer process with silicon release paper also can be used. After the adhesive has been applied, the coated film face stock is dried conventionally.

The following examples show how the present invention has been practiced, but should not be construed as limiting. In this application, all percentages, proportions, and parts are by weight and all units are in the metric system, unless otherwise expressly indicated. Also, all citations referred to herein are expressly incorporated herein by reference.

IN THE EXAMPLES

The following abbreviations are used in the examples that follow:

| | |
|---|---|
| EVA | Ethylene vinyl acetate copolymer |
| EAc | Ethyl acetate |
| 2-EHA | 2-Ethylhexyl acrylate |
| BA | n-Butyl acrylate |
| AA | Acrylic Acid |
| BPO | Benzoyl peroxide |
| Al(Ac)$_2$ | Aluminum acetylacetonate |
| MMA | Methyl methacrylate |
| IBOMA | Isobornyl methacrylate |
| VA | Vinyl acetate |
| DOF | Di-octyl fumarate |
| MEK | Methyl ethyl ketone |
| EA | Ethyl acrylate |
| IPA | Isopropanol |

The following test procedures were used in the examples:

1. 180° Peel Test: PSTC- 1 (Nov. 1975), Pressure Sensitive Tape Council, Glenview, Ill. Results of this test are reported in pounds/inch for a 1 in strip. 2. 178° Shear Test: PSTC-7 (Nov. 1975). Pressure Sensitive Tape Council. Results of this test are reported in hours/500 gm/0.25 in$^2$ at 22° C. 3. Polyken Tack Test: This test is conducted on a Polyken, Jr. Probe Tack Tester (Polyken is a trademark of the Kendall Company) supplied by Testing Machines, Inc. (Amityville, N.Y.) under the following conditions:

Probe: 304 SS. 0.5 cm. diameter probe with a 280 grit abrasive finish.
Dwell Time: 1 second
Probe Contact Pressure: 100 gm/cm$^2$
Probe Retraction Rate: 1 cm/sec.
Annular Weight: 20 gm.-100 gm/cm$^2$ pressure of a 0.5 cm. diameter probe Procedure: A one-inch square of MYLAR polyester film coated with the adhesive is placed on top of the annular weight so that the hole is completely covered by the adhesive area and this assembly placed in the weight carrier well. The machine is activated and the sequence of probe pressure and probe retraction automatically accomplished. The force required to free the probe from adhesive coated film, measured in grams/cm$^2$ is read from the indicator dial on the machine.

EXAMPLE 1

In a free-radical polymerization, 10 parts of an EVA (grade EY-90230, containing 60% ethylene and 40% vinyl acetate, from Quantum Chemical) was charged into a three-neck flask together with 70 parts of EAc and 20 parts of toluene. The mixture was heated to 75°-80° C. with mechanical stirring under a nitrogen blanket. A solution consisting of 0.025 parts of BPO and 22.5 parts of acrylic monomers (2-EHA/BA/AA in a weight ratio of 42.76/52.75/4.49, respectively) was added to the flask. The reaction mixture was then slowly heated to reflux until a mild exotherm (84°-89° C.) was observed. Five to ten minutes after the exotherm, a solution consisting of 0.075 parts of BPO and 69.4 parts of the same acrylic monomer mixture was added into the reactor continuously over a one hour time period. One hour after the completion of the monomer addition, an initiator solution (0.2 parts of BPO in 10 parts of EAc) was added and the reaction was allowed to reflux (85°-89°) for one hour. Additional initiator solution (0.2 parts of BPO in 10 parts of EAc) was added to the reactor and the temperature was maintained at reflux for three hours. The theoretical solids, RVT (#2 Spindle at 20 RPM) Brookfield Viscosity at 20° C. reported in centipoises (cps), DSC (differential scanning calorimetry) determined glass transition temperature (Tg), and GPC (gas phase chromatography) determined molecular weight, are shown in Table 1.

EXAMPLES 2-9

Using a polymerization procedure similar to Example 1, a series of copolymers containing different concentrations of EVA with the same acrylic monomer composition (2EHA/BA/AA -42.76/52.75/4.49) was prepared. The molecular weight was controlled by the ratio of toluene/EAc. Their physical properties including determined solids, RVT (#2 Spindle at 20 RPM) Brookfield Viscosity at 20° C., DSC determined Tg, and GPC determined molecular weight also are shown in Table 1.

TABLE 1

Physical Properties of EVA-Containing Copolymers*

| Ex. No. | NB# | EVA (wt-%) | NV % (Detd) | Visc. (cps) | Tg (°C.) (DSC) | GPC Mw | Mn | PDI |
|---|---|---|---|---|---|---|---|---|
| 1 | 4947-130B | 10 | 48.0 | 5,568 | −52 | $3.1 \times 10^5$ | $3.9 \times 10^4$ | 7.95 |
| 2 | 5041-128A | 0 | 45.0 | 944 | −52 | $2.5 \times 10^5$ | $2.8 \times 10^4$ | 8.98 |
| 3 | 5041-128B | 0 | 46.6 | 1,460 | −52 | $2.7 \times 10^5$ | $3.0 \times 10^4$ | 9.17 |
| 4 | 5041-130A | 2.5 | 47.1 | 2,248 | −53 | $2.9 \times 10^5$ | $2.8 \times 10^4$ | 10.29 |
| 5 | 4947-132A | 5 | 45.2 | 2,120 | −54 | $2.7 \times 10^5$ | $3.2 \times 10^4$ | 8.39 |
| 6 | 5041-130B | 7.5 | 48.0 | 4,128 | −56 | $3.1 \times 10^5$ | $2.8 \times 10^4$ | 11.10 |
| 7 | 5041-132 | 12.5 | 46.6 | 4,656 | −55 | $2.9 \times 10^5$ | $2.9 \times 10^4$ | 10.19 |
| 8 | 4947-131A | 15 | 48.7 | 14,200 | −50 | $3.4 \times 10^5$ | $3.7 \times 10^4$ | 9.22 |
| 9 | 4947-131B | 20 | 48.5 | 39,520 | −49 | $3.6 \times 10^5$ | $3.2 \times 10^4$ | 11.43 |

*NB# is notebook number
NV % (Detd) is non-volatile solids weight percent as determined
Mw is weight average molecular weight
Mn is number average molecular weight
PDI is Polydispersity Index, Mw/Mn

EXAMPLE 10

Approximately 1 mil dry thickness adhesive films of the copolymers synthesized in Examples 1-9 were obtained by drawing down the adhesive solutions (containing different amounts of Al(Ac)$_2$ cross-linking agent, on a 2 mil thick Mylar sheet using a wire wound rod. 15 minutes after the films were drawn, they were placed in an oven at 100° C. for 5 minutes. The adhesive-coated Mylar sheets then were mated to silicone coated liner (HP Smith 8024). The samples next were placed in a constant temperature room controlled at 72° F. and 50% RH for one to three days. PSA's were characterized by Polyken tack, 180° peel on both polyethylene (PE) and stainless steel (SS), and 178° stainless steel shear. The results are shown in Table 2.

TABLE 2

PSA Characterization of EVA Containing Acrylic PSA's

| NB# | Example No | Al(Ac)$_2$ (wt-%) | Polyken Tack | Peel[a] (PE) | Peel[a] (SS) | Shear (SS) |
|---|---|---|---|---|---|---|
| 5041-118B | 1 | 0.15 | 851 | 1.8 | 6.5c[b] | 0.5 |
| -118C | | 0.24 | 708 | 1.4 | 3.2 | 7.3 |
| -118D | | 0.32 | 677 | 1.2 | 2.8 | 32.3 |
| -118E | | 0.40 | 702 | 0.6 | 2.0 | >74.5 |
| 5041-136A | 2 | 0.08 | 1234 | z | 5.2c | 0 |
| -136B | | 0.16 | 1143 | 0.6 | 5.9c | 0.1 |
| -136C | | 0.24 | 1116 | 0.6 | 6.5c | 0.9 |
| -136D | | 0.32 | 727 | 0.4 | 6.7c | 3.1 |
| -136E | | 0.40 | 882 | 0.2 | 3.2 | 13.5 |
| 5041-137A | 3 | 0.08 | 1080 | z | 5.9c | 0 |
| -137B | | 0.16 | 1001 | 0.5 | 6.5c | 0.1 |
| -137C | | 0.24 | 1147 | 0.4 | 7.1c | 1.2 |
| -137D | | 0.32 | 989 | 0.3 | 3.5 | 10.2 |
| -137E | | 0.40 | 983 | 0.3 | 3.1 | 25.8 |
| 5041-139A | 4 | 0.08 | 1122 | 5.9c | 6.2c | 0 |
| -139B | | 0.16 | 897 | 2.2 | 6.9c | 0.2 |
| -139C | | 0.24 | 883 | 1.6 | 7.2c | 2.65 |
| -139D | | 0.32 | 973 | 1.3 | 3.5 | 13.6 |
| -139E | | 0.40 | 896 | 1.1 | 3.0 | 28.9 |
| 5041-122A | 5 | 0.08 | 1107 | 5.4c | 5.6c | 0 |
| -122B | | 0.16 | 956 | 2.1 | 6.3c | 0.2 |
| -122C | | 0.24 | 931 | 1.6 | 5.6c | 2.3 |
| -122D | | 0.32 | 919 | 1.2 | 3.2 | 15.2 |
| -122E | | 0.50 | 804 | 1.0 | 2.3 | 43.5 |
| 5041-140A | 6 | 0.08 | 983 | 6.2c | 6.5c | 0 |
| -140B | | 0.16 | 1028 | 1.7 | 7.0c | 0.4 |
| -140C | | 0.24 | 969 | 1.4 | 3.7 | 5.5 |
| -140D | | 0.32 | 908 | 1.2 | 3.2 | 34.4 |
| -140E | | 0.40 | 659 | 0.8 | 2.8 | >72 |
| 5041-141A | 7 | 0.08 | 809 | 2.0 | 6.6c | 0.1 |
| -141B | | 0.16 | 913 | 1.3 | 6.1c | 1.0 |
| -141C | | 0.24 | 884 | 1.0 | 2.9 | 25.3 |
| -141D | | 0.32 | 833 | 0.8 | 2.5 | >72 |
| -141E | | 0.40 | 784 | 0.6 | 2.0 | >72 |
| 5041-120A | 8 | 0.08 | 776 | 1.7 | 6.8c | 0.2 |
| -120B | | 0.16 | 799 | 1.5 | 4.5a/c[c] | 2.4 |
| -120C | | 0.24 | 790 | 1.1 | 3.0 | 39.0 |
| -120D | | 0.32 | 583 | 0.7 | 2.2 | >91 |
| 5041-121A | 9 | 0.08 | 797 | 1.3 | 3.3 | 0.4 |
| -121B | | 0.16 | 624 | 1.1 | 2.8 | 6.5 |
| -121C | | 0.24 | 650 | 0.9 | 2.1 | >72 |
| -121D | | 0.32 | 470 | 0.7 | 1.9 | >72 |

[a] 24 hour dwell
[b] c = cohesive failure
[c] a/c = adhesive/cohesive failure

Figure 2:
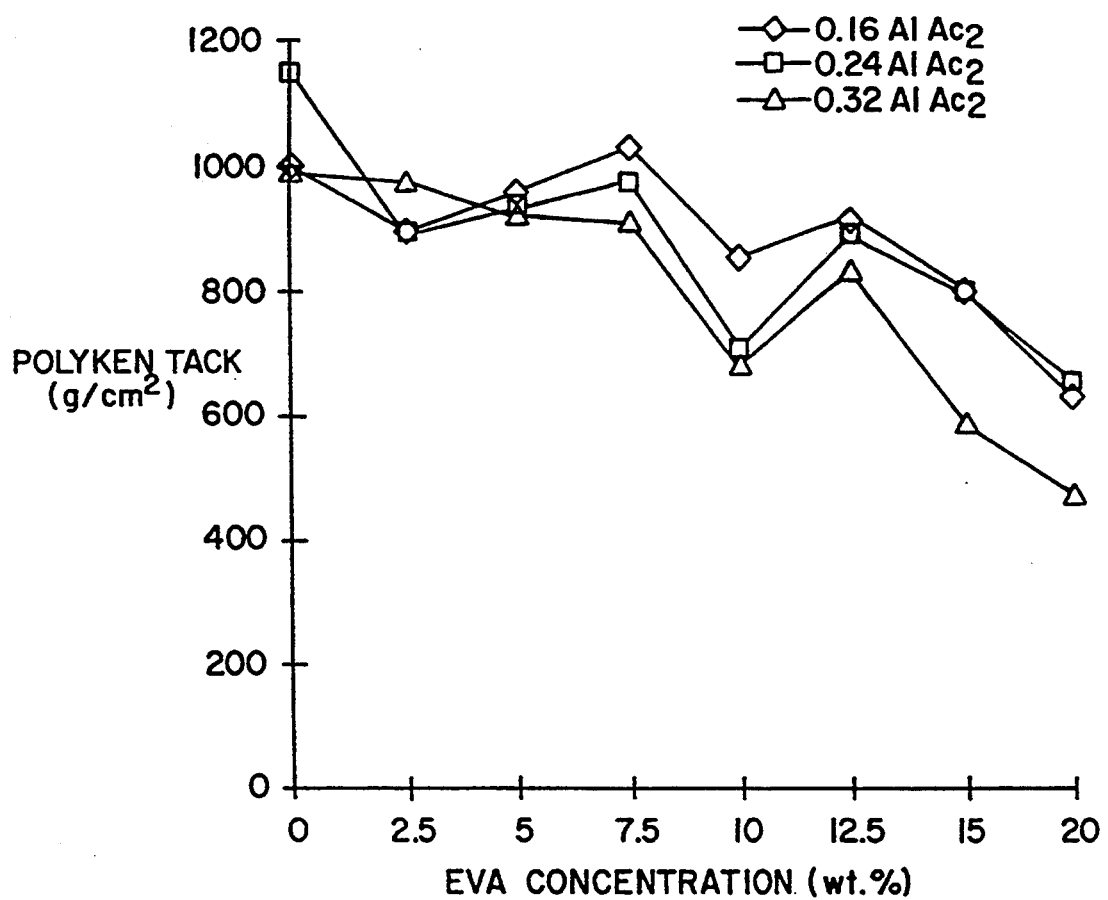
FIG. 2 graphically depicts the Polyken tack of the inventive pressure sensitive adhesive as a function of EVA concentration and for differing amounts of Al(Ac)2.
Figure 3:
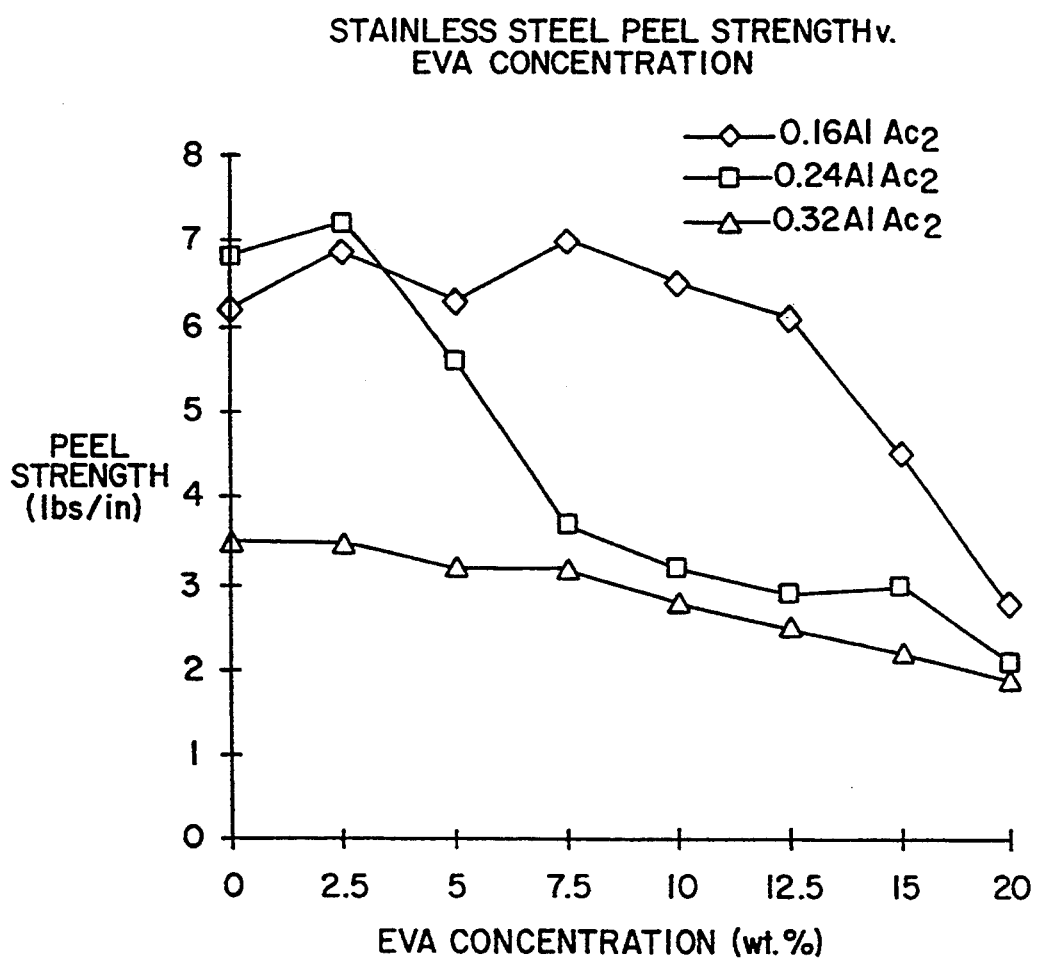
FIG. 3 graphically depicts the peel strength on stainless steel of the inventive pressure sensitive adhesive as a function of EVA concentration and for differing amounts of Al(Ac)2.

Selected data from Table 2 are graphically portrayed in FIGS. 1, 2 and 3 as respectively, plots of peel strength on polyethylene, Polyken tack, and peel strength on stainless steel as functions of EVA concentration and for differing amounts of Al(Ac)$_2$. As may be seen from FIG. 1, the peel strength on polyethylene of the PSA's of Examples 1–9 although appreciably improved by the addition of as little as 0.5% of EVA, declines sharply at EVA concentrations above about 10%. Thus, present invention comprehends an EVA concentration of from about 0.5% to about 10% by weight.

The result depicted in FIG. 1 is unexpected insofar as the prior art, as is illustrated by U.S. Pat. No. 5,079,047, teaches that EVA concentrations of 10–30% by weight are required to formulate PSA's having acceptable adherence to low surface energy substrates. Although unexpected, the result is advantageous as the lower solution viscosity attendant with a decrease in EVA concentration facilitates processing since, in solution polymerized systems, the EVA must be solvated. For solventless, photoinitiated systems such as that disclosed in U.S. Pat. No. 5,079,047, a high EVA content is, understandably, less of a concern. However, for solvent-based PSA's, the present invention affords the formulator the ability to tailor solution viscosity for optimum processibility and adhesion. In this regard, an EVA concentration of between about 0.5% and about 7% may be preferred in formulating a PSA system having a low viscosity but a high solids content and an excellent adherence to low surface energy substrates.

Turning to FIG. 2, the data show that in addition to an improvement in polyethylene peel strength, the tackiness of the inventive PSA as measured by Polyken tack is optimized within the contemplated EVA concentration range of about 0.5% to about 10% by weight. Thus, there may be seen to be an advantageous convergence of physical properties within the contemplated EVA concentration range in that a balance is struck as between peel strength, tack, and solution viscosity. That is, although, as Table 2 suggests, EVA concentrations higher than the contemplated range may result in improved shear strengths, the attendant increase in solution viscosity (Table 1) and decrease in tack (FIG. 2) deleteriously affects the overall performance of the PSA.

Looking next to FIG. 3, the data show that even at the relatively low EVA concentrations contemplated, the inventive PSA still evidences an acceptable adherence to higher surface energy substrates such as stainless steel that is comparable to formulations having lower EVA concentrations and consistently higher than formulations having higher EVA concentrations. This further confirms the advantageous convergence of physical properties within the contemplated EVA concentration range. Indeed, although a precept of the present invention is directed to the formulation of a PSA having an enhanced adherence to low surface energy substrates such as polyethylene, that precept should not be construed in a limiting sense as the applications for the invention, as the data show, are considerably broader.

EXAMPLES 11–17

A slight modification of the polymerization procedure described in Example 1 was used to prepare EVA containing acrylic copolymers using different grades of EVA, such as ELVAX 46C (46% vinyl acetate, Melt Index=95, E. I DuPont, Wilmington, Del.) and ELVAX 46L-03 (46% vinyl acetate, Melt Index=2.5, E. I DuPont), and different acrylic monomer compositions. Thus, for Example 15, a three-neck reaction flask was charged with 15.1 parts of EVA, 202.3 parts of EAc, 40.3 parts of toluene. The mixture then was heated with mechanical stirring under a nitrogen blanket. At a temperature of 73° to 77° C., a BPO solution (0.25 parts of BPO in 50.4 parts of EAc) was added and heating continued to reflux (90°–92° C.). After refluxing for 15 minutes, a solution consisting of 0.25 parts of BPO and 244.3 parts of acrylic monomers (2-EHA/MMA/IBOMMAA/AA-86.1/5.2/5.2/3.6) were continuous added into the reactor over a one hour period under reflux (92°–94° C.). The reaction was kept at reflux for two hours upon completion of the monomer addition. An initiator solution (1.0 parts of BPO in 50.4 parts of EAc) was added and the reaction was allowed to reflux (87°–90° C.) for one hour. Additional initiator solution (1.0 parts of BPO in 100.4 parts of EAc) was added to the reactor and the temperature was maintained at reflux for two hours. The compositions and PSA properties of these copolymers are shown in Tables 4 and 5, respectively.

TABLE 3

Composition of EVA Containing Acrylic Copolymers

| Ex. No. | NB# | Type | Monomers | Weight Parts |
|---|---|---|---|---|
| 11 | 5116-118 | EY-90230 | EVA/2 EHA/VA/DOF/AA | 5/72.2/14.2/4.8/3.8 |
| 12 | 5116-127 | EY-90230 | EVA/2-EHA/VA/DOF/IBOMA/AA | 5/72.2/4.8/4.8/9.5/3.8 |
| 13 | 5116-129 | EY-902302 | EVA/2-EHA/VA/DOF/IBOMA/AA | 5/72.2/9.5/4.8/4.8/3.8 |
| 14 | 5186-26B | EY-90230 | EVA/2-EHA/MMA/IBOMA/AA | 3/83/5/5/4 |
| 15 | 5193-90A | EY-90230 | EVA/2-EHA/MMA/IBOMA/AA | 3/83.5/5/5/3.5 |
| 16 | 5193-79A | ELVAX 46C | EVA/2-EHA/MMA/IBOMA/AA | 3/84/5/5/3 |
| 17 | 5193-79B | ELVAX 40L-03 | EVA/2-EHA/MMA/IBOMA/AA | 3/84/5/5/3 |

TABLE 4

PSA Properties of Copolymers from Examples 11-17[a]

| | Example Number | | | | | | |
|---|---|---|---|---|---|---|---|
| | NB# | | | | | | |
| | 11 | 12 | 13 | 14 | 15 | 16 | 17 |
| Properties | 5116-120 | 5116-137 | 5116-138 | 5193-70B | 5199-39 | 5193-83B | 5193-84B |
| SS Shear | 1.2 | 0.3 | 1.9 | 4.9 | 3.8 | 9.1 | 7.7 |
| SS Peel[b] | 2.4 | 1.9 | 2.7 | 3.1 | 2.3 | 3.2 | 2.7 |
| SS Peel[c] | 3.2 | 2.1 | 3.6 | 3.5 | 3.3 | 4.0 | 3.4 |
| PE Peel[b] | 0.9 | 0.8 | 0.6 | 1.0 | 0.9 | 0.9 | 0.9 |
| PE Peel[c] | 1.2 | 1.4 | 1.2 | 1.5 | 1.3 | 1.4 | 1.5 |
| Quick Stick[d] | 0.3 | 0.4 | 0.3 | 0.5 | 0.4 | 0.5 | 0.5 |
| Loop tack[e] | 0.7 | 0.6 | 0.7 | 1.0 | 1.0 | 0.9 | 0.9 |
| Polyken tack | 432 | 191 | 242 | 716 | 480 | 821 | 854 |

[a]Containing an optimized amount of Al(Ac)$_2$
[b]15 minutes dwell
[c]24 hr. dwell
[d]Quick stick on polyethylene is measured in lb/in.
[e]Loop tack on polyethylene is measured in lb/in.

EXAMPLES 18-22

Using a slightly different polymerization procedure to that described in Example 1, a series of EVA, containing acrylic copolymers consisting of 3% EVA (grade EY-90230, see Examples 11-17) and different concentrations of acrylic acid, were synthesized. Their composition and PSA properties are shown in Table 5.

TABLE 5

PSA Properties of Copolymers From Examples 18-22[a]

| | Example No. | | | | |
|---|---|---|---|---|---|
| | NB# | | | | |
| | 18[b] | 19[c] | 20[d] | 21[e] | 22[f] |
| Properties | 5106-172D | 5106-177D | 5106-178D | 5106-179D | 5106-180C |
| SS Shear | 3.4 | 2.2 | 1.6 | 4.8 | 4.6 |
| SS Peel[g] | 2.6 | 3.1 | 3.2 | 3.0 | 3.8 |
| SS Peel[h] | 2.8 | 3.9 | 4.2 | 4.5 | 5.1 |
| PE Peel[g] | 1.0 | 0.9 | 0.9 | 0.5 | 0 |
| PE Peel[h] | 1.6 | 1.5 | 1.4 | 0.9 | 0 |
| Quick Stick[i] | 0.6 | 0.5 | 0.6 | 0 | 0 |
| Loop Tack[j] | 0.9 | 0.8 | 1.1 | 0.5 | 0.1 |
| Polyken Tack | 636 | 421 | 265 | 172 | 124 |

[a]Containing an optimized amount of Al(Ac)$_2$
[b]4947-193B: EVA/2-EHA/MMA/AA - 3.0/81.7/12.3/3
[c]5106-173A: EVA/2-EHA/MMA/AA - 3.0/81.7/10.3/5
[d]5106-173B: EVA/2-EHA/MMA/AA - 3.0/81.7/8.3/7
[e]5106-175A: EVA/2-EHA/MMA/AA - 3./81.7/6.3/9
[f]5106-175B: EVA/2-EHA/MMA/AA - 3.0/81.7/4.3/11
[g]15 minutes dwell
[h]24 hr. dwell.
[i]Quick stick on polyethylene is measured in lb/in.
[j]Loop tack on polyethylene is measured in lb/in.

We claim:

1. A pressure sensitive adhesive comprising the free-radical polymerization reaction product prepared in the presence of a free-radical initiator and dispersed in organic solvent of:

(a) between 7% and about 0.5%, by weight of the non-volatile solids of said reaction product, of an organic solvent soluble, high-ethylene-containing polymer comprising at least about 40% by weight ethylene monomer; and (b) a mixture of ethylenically-unsaturated monomers comprising:
 (i) between 0% and about 10%, by weight of the non-volatile solids of said reaction product, of an ethylenically-unsaturated carboxylic acid or anhydride; and
 (ii) a non-carboxylic acid/non-anhydride-functional vinyl monomer,
 wherein the $T_g$ of said polymerized mixture of monomers is not substantially above about $-20°$ C., said reaction product having a molecular weight of between 100,000 and 600,000, and a $T_g$ not substantially above about $-20°$ C.

2. The pressure sensitive adhesive of claim 1 wherein (a) said high-ethylene containing polymer is and ethylene vinyl acetate copolymer, and (b) said mixture of monomers comprises (i) acrylic acid, and (ii) methyl methacrylate, isobornyl methyacrylate, and 2-ethylhexyl acrylate.

3. The pressure sensitive adhesive of claim 1 which has been cross-linked with an aluminum, titanium, or zirconium salt or chelate, or a melamine resin.

4. The pressure sensitive adhesive of claim 1 wherein said high ethylene-containing polymer (a) has a molecular weight of between about 10,000 and 500,000 and a $T_g$ of not above about $-10°$ C.

5. The pressure sensitive adhesive of claim 1 wherein said high ethylene-containing polymer (a) is selected from one or more of the group consisting of ethylene/methyl acrylate/methacrylic acid terpolymer, ethylene/vinyl acetate (EVA) copolymer, ethylene/butyl acrylate (EBA) copolymer, ethylene/methyl acrylate (EMA) copolymer, ethylene/ethyl acrylate copolymer, ethylene/n-hexyl acrylate copolymer, or ethylene/2-ethylhexyl acrylate copolymer.

6. The pressure sensitive adhesive of claim 1 wherein said acrylic monomer (b)(i) is one or more of acrylic acid, crotonic acid, vinyl acetic acid, fumaric acid, maleic acid, allyl malonic acid, allyl succinic acid, itaconic acid, citraconic acid, a $C_1-C_4$ alkyl ester thereof, and their corresponding anhydride.

7. The pressure sensitive adhesive of claim 1 wherein said vinyl monomer (b)(ii) is one or more of (meth)acrylic esters of $C_1-C_{18}$ alkyl groups, styrene, vinyl chloride, or vinylidene chloride.

8. The pressure sensitive adhesive of claim 1 wherein said high ethylene-containing polymer comprises a terpolymer.

9. The pressure sensitive adhesive of claim 1 wherein said organic solvent is one or more of an alcohol, an ester, an ether, or an aromatic solvent.

10. The pressure sensitive adhesive of claim 9 wherein said organic solvent is one or more of ethyl acetate, butyl acetate, methyl ethyl ketone, cyclohexanone, acetone, toluene, xylene, benzene, or cyclohexane.

* * * * *